United States Patent [19]

Peck

[11] Patent Number: 4,875,729
[45] Date of Patent: Oct. 24, 1989

[54] APPARATUS FOR PACKAGING WASTE MATERIAL

[76] Inventor: Joel S. Peck, 434 E. 70th St., #3A, New York, N.Y. 10021

[21] Appl. No.: 152,911

[22] Filed: Feb. 5, 1988

[51] Int. Cl.$^4$ .................. A01K 29/00; E01H 1/12
[52] U.S. Cl. .................... 294/1.3; 15/257.4
[58] Field of Search ............ 294/1.1, 1.3–1.5, 294/55; 15/104.8, 257.1, 257.4, 257.7; 119/1; 141/108, 109, 391; 248/95, 99, 100; 383/7, 10, 13, 70, 71, 77

[56] References Cited

U.S. PATENT DOCUMENTS

| | | | |
|---|---|---|---|
| 3,052,214 | 9/1962 | Johnson | 294/1.4 |
| 3,868,135 | 2/1975 | Magliaro | 294/1.5 |
| 4,185,861 | 1/1980 | Berner | 294/1.5 |
| 4,191,414 | 3/1980 | Dameron | 294/1.4 |
| 4,221,415 | 9/1980 | Ganz | 294/1.4 |
| 4,341,410 | 7/1982 | Summach | 294/1.3 |

FOREIGN PATENT DOCUMENTS

| | | | |
|---|---|---|---|
| 2379652 | 10/1978 | France | 294/1.4 |
| 2444752 | 8/1980 | France | 294/1.4 |
| 7713350 | 9/1979 | Netherlands | 294/1.5 |

Primary Examiner—Johnny D. Cherry
Attorney, Agent, or Firm—Bryan, Cave, McPheeters & McRoberts

[57] ABSTRACT

Apparatus (including a frame and a bag), a preferred bag, and a method for packaging waste for disposal are disclosed. The frame fits into the bag at the open end of the bag. The frame has a central open area, and when waste material is placed on the outside of the bag corresponding to the open area of the frame, the waste material and the adjacent portion of the bag are pulled by gravity down through the open area of the frame. That pulls the bag tightly around the frame, which in turn facilitates the inversion of the bag as the bag is removed from the frame. Inversion of the bag results in the waste being trapped inside the bag, which may then be securely closed for disposal of the waste. The sizes and shapes of the frame and bag are not critical. The device finds particular use as a so-called "pooper scooper" for dogs.

14 Claims, 4 Drawing Sheets

APPARATUS FOR PACKAGING WASTE MATERIAL

BACKGROUND OF THE INVENTION

This invention relates to the field of waste disposal and, more specifically, to an apparatus (comprising a frame and a bag) and to a preferred bag for packaging waste for disposal.

Under the so-called "pooper scooper" laws, those responsible for a dog (usually, the owner) must promptly remove any solid or semi-solid waste material left by the dog on sidewalks, etc. Thus, a person wishing to obey such a law has the problems of removing the offending material and then of its disposal.

There have been various attempts to deal with those problems. For example, those who can reason with their dogs often ask the dogs to consider using a circumscribed area on the ground upon which a substrate such as newspaper has been placed. If there are no mishaps, the newspaper may be folded to wrap the waste and the entire package thereafter disposed of. Those who cannot reason with their dogs as to the location but have quick reflexes sometimes attempt to place the substrate/wrapping material into position on the ground before the waste hits the ground.

For those with slower reflexes who still wish to comply with the law, a shovel may be employed to remove the waste material from the ground after the fact. The waste can then be put into a bag or placed on a substrate for wrapping and disposal. Some individuals have been known to place one of their hands inside a bag made of flexible material as if it were a glove, pick up the waste material using the "gloved" hand, and pull the end of the bag off the hand in a manner so as to invert the bag and package the waste material inside the bag for later disposal.

One device that has been used for attempting to scoop up waste after it is on the ground consists of a framework having a rectangular opening at its front end and a bag that is attached to the framework with the opening of the bag congruent with the rectangular front opening of the framework. The framework with the bag attached is placed on the ground with one side of the rectangular opening touching the ground. The device is pushed forward towards the waste material on the ground to scoop up the waste and have it pass through the rectangular opening into the rest of the attached bag. The bag is removed from the framework for disposal.

Each of those methods and devices has drawbacks. One problem with the apparatus just described is that the opening of the bag and the frame become contaminated with waste material. That is because the opening of the bag is at the leading edge of the framework and contacts the waste on the ground during the scooping maneuver. This makes closing the bag and disposal somewhat tricky. Other drawbacks of the various apparatus and methods used are obvious. Shovels become contaminated; the "gloved hand" method is aesthetically unpleasing, not to mention the problems encountered if the "glove" (i.e., bag) breaks at an inopportune moment.

SUMMARY OF THE INVENTION

A new apparatus that avoids the above-noted problems and has numerous other advantages has now been developed. Broadly, the device facilitates the disposal of the waste by packaging it in a rapid and reliable manner and with a minimum of handling and comprises:

(a) a bag having an open end, a periphery, a central portion, an inner surface, and an outer surface; and (b) a frame having sides and having an inversion point, the frame being at least partially within the bag thereby to support it and having an open area located near the central portion of the bag; the bag being larger than the frame to provide sufficient slack so that after waste is placed on the outer surface of the central portion of the bag, the waste and that portion of the bag nearest the waste are pulled down by gravity at least partially into the open area of the frame and sections of the bag are drawn snug towards the frame, the frame and bag thereafter cooperating so that as a portion of the open end of the bag is moved towards the inversion point to remove the bag from the frame, the portion of the bag lying near the inversion point becomes inverted and further movement of the end of the bag in a direction to remove the bag from the frame results in inverting the rest of the bag, thereby placing the outer surface of the bag on the inside and packaging the waste inside the bag.

In other aspects of the invention, the frame comprises at least two members (and preferably three in the approximate shape of a triangle), and/or the bag carries closure or locking means so that it may be tied shut after the waste material is inside, and/or a plurality of bags may be stacked or nested one inside the other on the frame, and/or a handle portion is attached to the frame and the handle has grippers or other securing means for preventing the bag or bags from sliding off or otherwise being removed from the frame until such removal is required. Sticks or other disposable members may be carried within the handle and the sticks employed to help position the waste material on the device.

Another aspect of the invention concerns a preferred bag having integral flaps for tying the bag closed. The two major faces of the bag are attached directly or indirectly (i.e., through an intervening edge panel) to each other at their corresponding edges.

The frame itself need not be rigid and may be comprised of pieces that can rotate with respect to one another. Accordingly, in one embodiment the frame is collapsible and may be collapsed and retracted into or around or about the handle of the device to provide a small readily portable device. In another embodiment, the frame members may be rotated with respect to one another to form a "V" shape to provide an inversion point at what becomes the lowest vertical point of the "V" frame rather than at the lateral sides of the flat (unrotated) frame.

Devices of this invention may be used to efficiently and effectively scoop waste material off a variety of substrates (for example, concrete, carpeting, sand, grass, snow, leaves) or the device may be used to catch the waste in mid-air, before it hits the ground. The frame of the device remains clean because it is covered by the bag, and the open end of the bag is not contaminated with waste either during the scooping procedure or later. The leading edge of the bag, which does become contaminated during the scooping procedure, is placed inside by the inversion procedure. Thus, what becomes the outer surface of the bag after packaging is complete and the open end of the bag remain free of waste. Other advantages, aspects, and embodiments of the invention will be described below.

BRIEF DESCRIPTION OF THE DRAWINGS

To facilitate further description of the invention, the following drawings are provided in which.

These drawings are provided for illustrative purposes only and should not be construed to limit the scope of the invention.

DETAILED DESCRIPTION OF THE INVENTION

Figures 1, 2, 3, 4:
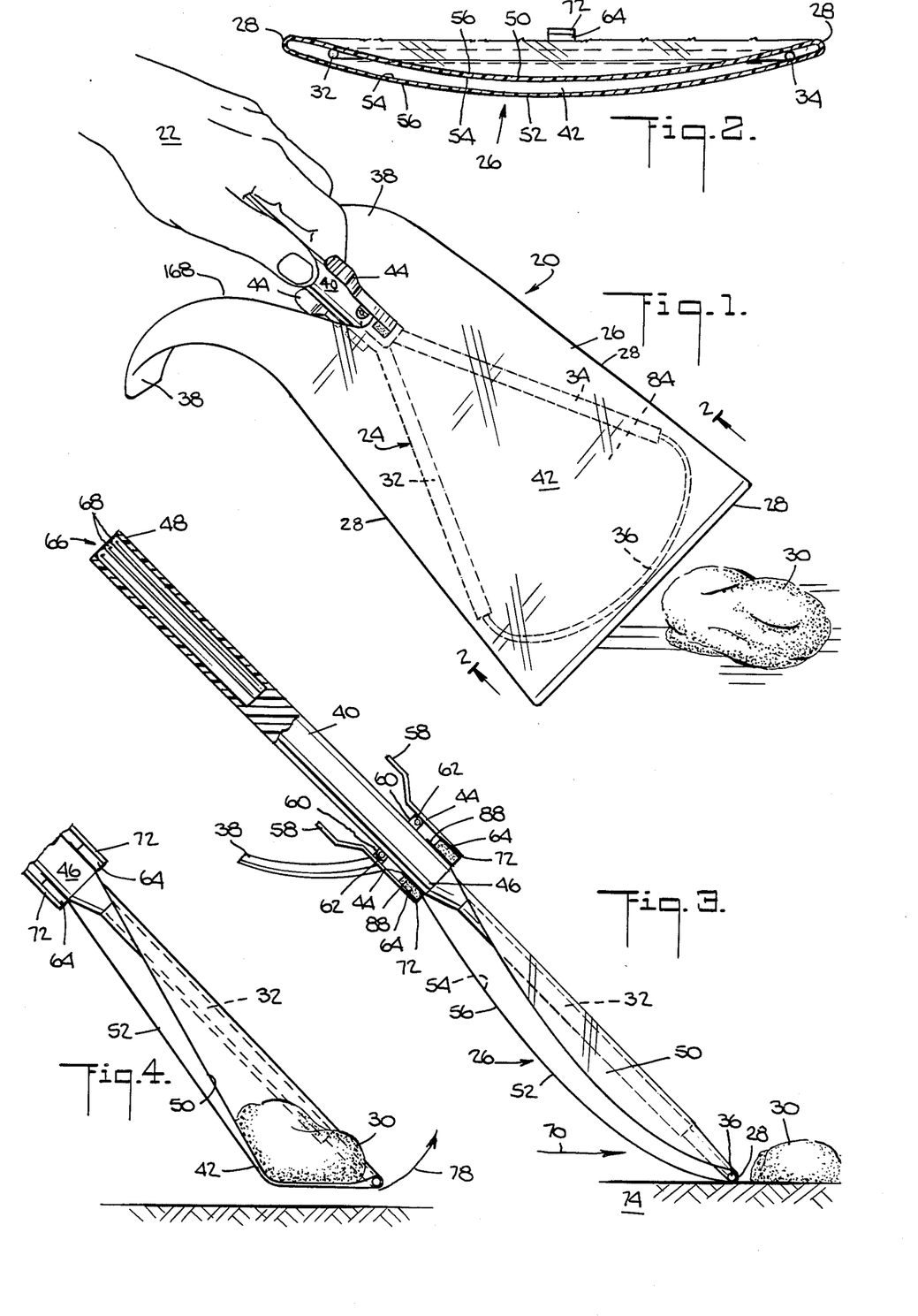
FIG. 1 is a perspective view of the device being held in a position to scoop up waste material on the ground.
FIG. 2 is a cross-sectional view taken along line 2—2 of FIG. 1.
FIG. 3 is a side elevational view of the device of FIG. 1 before waste material is on the device.
FIG. 4 is a detail view of FIG. 3 after the waste material has been placed on the device.

In FIG. 1, handle 40 of device 20 is being held in left hand 22. The device comprises frame 24 and bag 26 having periphery 28 and two integral flaps 38 at open end 168 (or rear extent) of the bag. Frame 24 comprises side 32, side 34, and side 36, which is located at the leading or front edge of the device. The three sides lie substantially in the same plane and in substantially the shape of a triangle. Optional securing means 44 prevents bag 26 from sliding down and off the frame while the device is downwardly disposed towards waste 30, which is on the ground. The device need not have securing means 44. In that case, left hand 22 could hold the rear portion of the bag against handle 40 to prevent the bag from sliding off the frame. Central portion 42 of bag 26 is located in gap (or space or void) 84 between frame members (or sides) 32, 34, and 36.

In the cross-sectional view of FIG. 2, central portion 42 of bag 26 lies below the plane of frame members 32 and 34. Bag 26 has two major faces, upper face 50 and lower face 52, each of which has an inner surface 54 and an outer surface 56. Bag 26 may be thought of as having one continuous inner surface (or inside) 54 and one continuous outer surface (or outside) 56. Pressure pad 64, which is attached to front end 72 of securing means 44 (as more clearly shown in FIG. 3), temporarily secures bag 26 in place. The pad may be of any material that provides the required friction, such as rubber or flexible foam.

In FIG. 3, the device has been positioned with its leading edge on ground 74 so that it can be moved in the direction indicated by arrow 70 to scoop up waste material 30, which is also on the ground. Handle 40 has front end 46 and rear end 48. The frame is attached to the front end of the handle, and cylindrical cavity 66 terminates at rear end 48. Elongate sticks 68 (for example, ice cream sticks or tongue depressors) are stored within cavity 66. A stick 68 may be removed from cavity 66 and used to help push and position waste 30 on central portion 42 of the bag (see FIGS. 1 and 2).

Each of the two securing means 44 is rotatably connected to the handle, here by a pivot pin 62 in ears 60. The two securing means 44 are biased (spring biasing means not shown) so that pressure pads 64 connected to front ends 72 frictionally retain reinforced areas 88 of bag 26 against the outer portion of front end 46 of handle 40. (Reinforced areas 88 on bag 26 are better seen in FIG. 13.)

In FIG. 4, waste 30 is positioned adjacent central portion 42, both of which have been pulled down by gravity so that much of waste material 30 lies below the plane defined by the frame members. Arrow 78 indicates the direction of travel of the front end of the device for subsequent use.

Figures 5, 6:
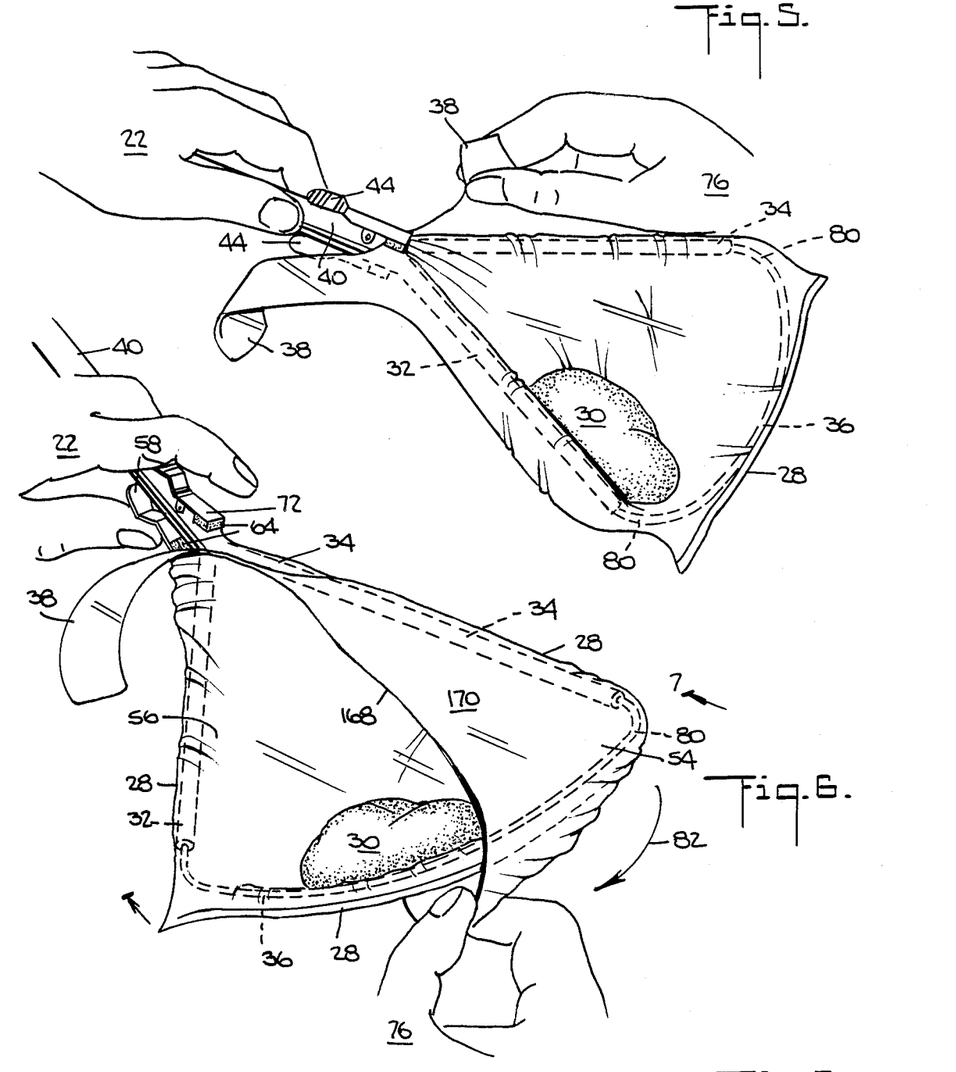
FIG. 5 is a perspective view showing the first stage in removing the bag from the frame of the device of FIG. 4 to package the waste material.
FIG. 6 is a perspective view of the device showing a further stage in the removal of the bag from the device.

As best seen by comparing FIGS. 1 and 2 with FIGS. 4 and 5, before waste 30 is positioned on central portion 42 of bag 26, the bag fits somewhat loosely on the frame because the bag is larger than the frame, that is, there is some slack. In FIG. 2 periphery 28 is seen to extend beyond frame members 32 and 34. In contrast, in FIGS. 4 and 5, the weight of waste 30 has pulled central portion 42 of the bag downward so as to take up the slack by pulling various portions of periphery 28 of the bag against the frame. For example, a portion of the front or leading edge of the bag has been drawn snug against a corresponding portion of leading side 36 of the frame and sections of the periphery of the bag have been drawn snug against corners (or shoulders) 80, which are located at the approximate places where lateral side members 32 and 34 meet front side member 36. In FIG. 5, left hand 22 is holding the device and right hand 76 is commencing the bag-removal and wrapping (or packaging) procedure.

During the removal procedure, the bag is inverted so that the outside of the bag becomes the inside and the waste material thereby becomes packaged inside the bag. Inversion of the bag may be facilitated by the frame increasing in transverse size from the rear of the frame to the front. For example, the device of FIG. 5 increases in lateral width from near handle 40 to a maximum at the imaginary line connecting the two corners 80. Inversion is also made possible in the embodiments shown by the periphery of the bag or at least certain sections of the periphery of the bag being pulled or drawn snug towards the inversion point and at least one other point on the frame. Usually, the weight of the waste material will pull the central portion of the bag down sufficiently to take up the slack in the bag provided the bag is sufficiently flexible and is not too big.

In FIG. 5, right hand 76 is grasping a portion of the open end of the bag towards the rear of the device. Right hand 76 then moves in a direction towards the front side 36 of the frame. The bag is usually manipulated at or near the beginning of this procedure to partially invert the small section of the opening of the bag between the thumb and forefinger of hand 76. That part of the bag is then drawn forward (i.e., towards front side 36 of the frame). Whether or not such preliminary inversion is carried out, at some point along the frame at or before corner 80, the bag will not be able to slide off the frame (because the bag lies so tightly against the frame) and the outer surface of the bag immediately adjacent to that point will be forced to fold over on itself as the open end of the bag continues to be pulled forward. Alternatively, gripping means (for example, adhesive) may be placed on a small section of the side portion of the frame to prevent the bag from sliding off the frame and thereby to cause inversion to occur at that point as the opening of the bag is being pulled forward. In that case, the lateral sides of the frame need not be diverging and may be parallel or converging.

In FIG. 6, arrow 82 indicates the direction in which the end of bag 26 is pulled to continue the removal procedure. Left hand 22 is holding the device by handle 40 and at the same time it is pushing release mechanism handles 58 towards main handle 40 to move pressure pads 64 away from the bag, thereby to release the bag and allow the inversion and removal procedure to continue. In many cases it will not be necessary to push release handles 58 because the act of pulling inverted portion 170 of the bag forward will pull the temporarily secured portions of the bag out from under pressure pads 64.

Figure 7:
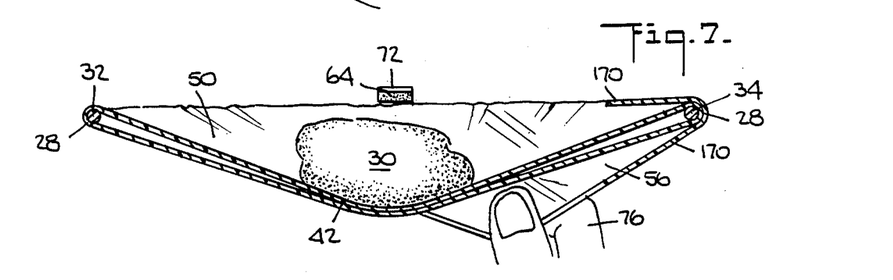
FIG. 7 is a cross-sectional view of the device of FIG. 6 taken along line 7—7 of FIG. 6.

At some point during the inversion/removal procedure, the part of the opening of the bag lying at the bottom of the bag-frame combination must pass below the lowest point of central portion 42. If that does not occur, the edge of the already inverted portion of the opening of the bag will not clear the waste material and central portion of he bag that are located below the plane of the frame, and the inversion and removal procedure will not be able to continue. Thus, FIG. 7 shows a section of inverted portion 170 of the bag positioned below the bottom most part of central portion 42 and waste material 30 to enable the opening of the bag to clear (pass below) them at their lowest point. The top section of inverted portion 170 must pass above waste 30, and FIG. 7 shows this too. Finally, FIG. 7 shows that the weight of waste material 30 on central portion 42 has drawn part of periphery 28 of the bag against frame sides 32 and 34.

Figures 8, 9, 10, 11, 12, 13, 14:
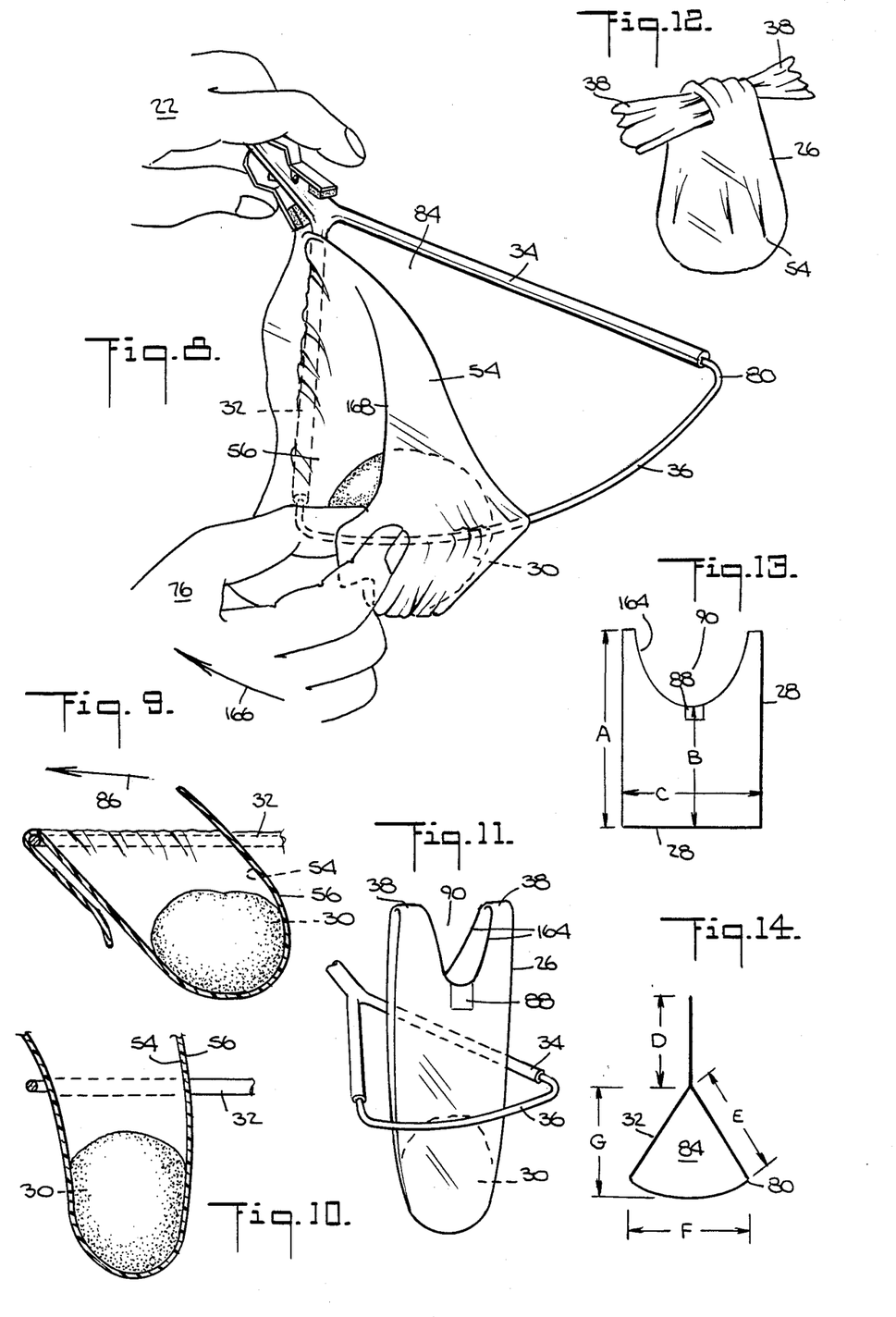
FIG. 8 is a perspective view showing a later stage in the removal of the bag from the frame of the device.
FIGS. 9 and 10 are detail views showing subsequent steps in the removal of the bag from the frame.
FIG. 11 shows the waste material in the bag after the bag has been completely inverted and is no longer supported by the frame.
FIG. 12 is a view showing the two integral strips on the bag tied together to securely close the bag.
FIG. 13 is a plan view of the preferred bag of the invention.
FIG. 14 is a plan schematic view of the preferred frame and handle of the invention.

In FIG. 8 the bag has cleared corner 80 between frame members 34 and 36 and the inversion process is essentially complete: outer surface 56 is now the inside of the bag in contact with waste material 30. Void (or space or gap) 84 between the three frame members is no longer completely covered by the bag. The full completion of the inversion/removal procedure is then accomplished as leading edge 168 of the inverting bag clears the remaining shoulder between frame members 32 and 36. This occurs with continued travel along the direction of arrow 166.

FIGS. 9 and 10 show further stages of removing the bag from the frame. Arrow 86 indicates the direction of travel of the bag to complete removal.

FIG. 11 shows the completely inverted bag containing the waste material situated freely within void 84 of the frame at the conclusion of the removal/inversion procedure. Inner edge 164 of integral flaps 38 define U-shaped cutout 90. Two reinforced areas 88 (only one of which is shown) are located at the bottom of the U-shaped cutout. It is those two portions of the bag that securing means 44 contacts to temporarily secure the bag to the frame. Reinforced areas 88 are optional; any non-reinforced area of the bag may serve as the contact area of the bag for the gripping means.

FIG. 12 shows integral flaps 38 tied together so as to close and secure the opening of the bag to prevent waste material from leaving the bag.

FIG. 13 is a plan view of the preferred bag. The dimensions of the bag will depend principally on the dimensions of the frame: the bag must be larger than the frame so that the bag can fit onto the frame but should not be so large that too much slack is provided. FIG. 14 is a schematic diagram of a preferred frame and handle of the invention in which the frame is generally triangular in shape. Various combinations of bag and frame shapes and sizes may be used. For the shapes shown in FIGS. 13 and 14, three preferred size combinations are shown below.

| Dimension Line | Approximate Size In Inches | | |
|---|---|---|---|
| | Set I | Set II | Set III |
| A | 20 | 16 | 12 |
| B | 12.5 | 10.5 | 8.5 |
| C | 12.5 | 10.5 | 8.5 |
| D | 10.5 | 8.5 | 5.5 |
| E | 8.25 | 6.5 | 5 |
| F | 10.5 | 8.5 | 6.5 |
| G | 9.5 | 7.5 | 5.5 |

The bag may be made of any material that has the required physical properties. Important physical properties include abrasion resistance, drapability, deformability, resilience, and strength. Preferred bags are of thin (about 0.5–2.5 mils in thickness) plastic film. Any size and shape bag and any bag material may be used so long as the bag in combination with the frame and rest of the device is capable of performing the desired function. Shapes and features other than that shown in FIG. 13 may be used, for example, the bag may be square or rectangular or have no U-shaped cutout or have no reinforced areas.

Similarly, the frame and handle may be made of any materials that have the required properties such as strength and resilience. Usually, the frame and handle will be made of metal and/or plastic. The particular size and shape of the frame are not important so long as the frame can interact with the bag to perform the desired function. Thus, the frame will generally have one or more frame members that provide a point along the frame at which inversion of the bag can take place (usually because of the bag being pulled taut in a transverse direction by a transverse frame size that increases towards the front of the device). Desirably, the frame will have a leading side to facilitate scooping up waste material that is on the ground and the leading member will be thin and not easily bent or deformed. The leading side may be straight or concave in, concave out (as shown in FIG. 14) being preferred. The bag must be sufficiently abrasion resistant so that the integrity of the bag is not compromised by the bag's being pushed along the ground (see FIGS. 3 and 4).

The location of the inversion point for a given bag/frame combination will vary depending on what means are used to retard the forward motion of the bag and hinder its sliding on the frame, e.g., adhesive on a lateral side of the frame, the bag's being pulled taut against the frame by the weight of the waste, etc. If the bag is pulled taut by the frame (as in the embodiments of FIGS. 1–19), the location of the inversion point will depend on the sizes of the bag and the frame, the physical characteristics of the bag employed (for example, the resistance of the bag to stretching, its tensile strength, and its flexibility and resilience), and on how tightly the bag's periphery is pulled against the frame and where. The increase in the lateral size of the frame of FIG. 14 towards the front of the frame and use of a bag not too much larger than the frame insures that inversion will occur at or before corner 80. If the bag is too large, inversion will not occur, regardless of the weight of waste material 30.

Two or more bags may be nested within one another and the frame placed within the innermost bag of the nested stack. In that case, the user would employ only the outermost bag, thereby leaving the rest of the stack of bags on the frame for subsequent use.

Other shapes may be employed for the frame. For example, the frame may be a polygon of more than three sides or the frame may be circular. The particular shape is not important so long as the device is able to perform the desired function. A frame with parallel or even converging sides may be used if adhesive or other such means is located on one section of a side for causing the inversion.

Figures 15, 16, 17, 18, 19:
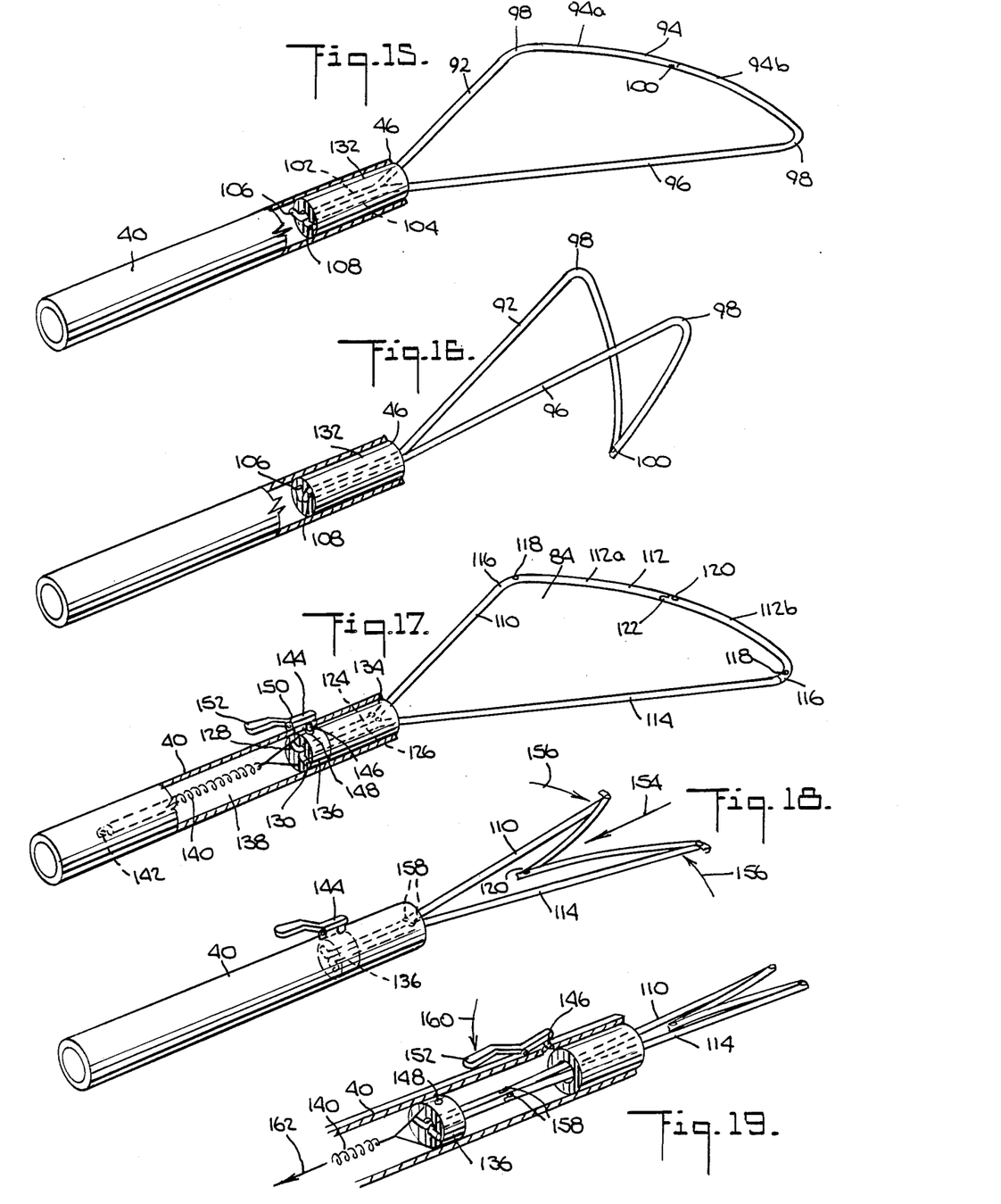
FIG. 15 is a perspective view of another embodiment of the invention in which the two frame members are rotatably connected to one another.
FIG. 16 is a view of the device of FIG. 15 after the two frame members have been rotated up towards one another.
FIG. 17 is a view of a third embodiment of the device in which the frame members are rotatably connected to one another to permit the frame to be collapsed for storage and portability.
FIG. 18 is a view of the device of FIG. 17 showing the frame being collapsed for storage within the handle of the device.
FIG. 19 is a view of the device of FIGS. 17 and 18 in which the frame has been collapsed and is being retracted into the handle of the device.

The frame need not lie in only one plane. For example, the front or leading edge of the frame and the forward sections of the two side frame members of the device of FIG. 1 may be bent upwards. Even if the frame members lie in a single plane at the start of the scooping and disposal operation, the frame need not remain in that one plane. For example, FIGS. 15 and 16 illustrate frame members that can rotate with respect to one another. The frame comprises side pieces 92 and 96, front piece 94 (which itself is comprised of segments 94a and 94b) and pivot 100. Corners 98 are located between the side pieces and the front pieces. Side pieces 92 and 96 are connected to straight portions 102 and 104, which are rotatably mounted in block 132. Extensions 102 and 104 terminate in bent portions 106 and 108, which prevent the frame from being pulled out of block 132.

FIG. 16 shows the two halves of the frame rotated up out of the plane they define when they are in their normal (or down) position. In FIG. 16, corners 98 have been rotated up out of the plane and towards one another.

To use this device, waste material is again positioned on the central portion of the bag (not shown), which is within gap (or void) 84 between the frame members. The two frame members are then rotated u into the position shown in FIG. 16 either manually or by spring-loaded or other means (not shown). At this point, most or all of the waste material hangs down below the two corners 98. To remove and invert the bag of this device, the bottom portion of the bag near its opening, which is pointed towards the rear of the handle, is grasped and pulled forward. That portion of the bag must be low enough to clear the bottom of the waste material and the central portion of the bag adjacent to it at their lowest point while they are hanging from the frame. Pivot point 100, which as shown in FIG. 16 is a low point for the frame, may help invert the bag. However, inversion may start before the lower open end of the bag is brought forward enough to meet pivot point 100. The top of the open end of the bag must also pass over the high points of the frame, corners 98 in FIG. 16.

FIGS. 17, 18, and 19 illustrate another embodiment of the invention, namely, a collapsible device. This device may be used in the same manner as the devices previously described except that it has the advantage that the frame can be collapsed. All of the frame or a substantial portion of it can be stored inside or around or about the handle so that the device may be carried in, for example, a pocket or pocketbook.

The frame comprises side piece 110, front piece 112 (which comprises portions 112a and 112b), side piece 114, corners 116, straight extension portions 124 and 126 (which are slidably mounted within block 134), and bent portions 128 and 130 (which prevent the frame from being pulled forward out of slidable block 136). The frame pieces are rotatably connected to one another at pivot points 120, 118, and 158. Extension or tab 122 on frame member 112b prevents sections 112a and 112b from rotating with respect to one another to move pivot point 120 forward beyond its forwardmost location shown in FIG. 17. Sliding block 136 is slidably mounted in path 138 of handle 40. Block 136 is biased towards the rear of the handle by spring 140, which is attached at its forward end to block 136 and at its rear end to fixed point 142.

Release mechanism 144 is rotatably mounted to handle 40 on ears 150. The forward end of release mechanism 144 carries pin 146, which passes through the outer surface of handle 40 into hole 148 located at the top of sliding block 136. As long as pin 146 lies within hole 148, block 136 is prevented from moving back under the force of spring 140. When trigger 152 of release 144 is pushed down in the direction shown by arrow 160, pin 146 is withdrawn from hole 148 and spring 140 pulls block 136 back in the direction shown by arrow 162. Prior to depressing trigger 152, pivot 120 is moved towards the rear of the device in the direction shown by arrow 154. That in turn causes rotation of the frame members with respect to one another and movement of side pieces 110 and 114 towards one another in the directions shown by arrows 156. When trigger 152 is depressed, the collapsed frame will be drawn into the front hollow storage section of handle 40. (A similar type of spring-powered mechanism may be used to rotate the two frame halves of the device of FIG. 15 when a trigger is depressed.)

To use this device, the front end of the collapsed frame is pulled forward and pivot 120 is moved to its forwardmost position (FIG. 17). A spring (not shown) biases trigger 152 up, thereby pushing pin 146 down into hole 148 when the hole is brought into registration with the pin. That prevents the frame from collapsing and being moved inward by spring 140. A bag may be stored in a rear hollow section of handle 40. Regardless of where the bag is stored, it is placed on the frame and the device is used in the same manner the device of FIG. 1 is used. After disposal of the waste, the device may be collapsed and stored again in a pocket or pocketbook.

The collapsible frame and bag may have any shapes and be of any materials that allow them to perform the desired function. The frame may be circular, oval, rectangular, etc. so long as it can be collapsed or folded into or around or about the handle. Means may be present to push out or unfold or erect the collapsed frame. For example, spring-biased means similar to those in FIGS. 17-19 may be used to push the collapsed frame out of the handle when a trigger is depressed. Other means dissimilar to those of FIGS. 17-19 may also be used. The frame need not fold only but could also have telescoping members.

Other variations and modifications may be made in this and all other embodiments shown herein, and the claims are intended to cover all variations and modifications that fall within the true spirit and scope of the invention.

I claim:

1. A process for packaging waste material in a bag in a rapid and reliable manner, with a minimum of handling, and without the need to contaminate the open end of the bag with waste material during the packages process, said process comprising:
   (a) providing a packaging device comprising:
      (i) a bag having an open end, a closed end, a first surface, a second surface, a central portion spaced from the open end of the bag, and a periphery;
      (ii) a frame defining an open area and located at least partially within the bag with the first surface of the bag directed inwardly towards the frame, the second surface of the bag directed outwardly away from the frame, and the central portion of the bag in registration with the open area of the frame; and
      (iii) means to invert the bag as the bag is removed from the frame after waste material has been positioned on the central portion of the second surface of the bag;
   (b) positioning the waste material on the central portion of the second surface of the bag; and
   (c) removing the bag from the frame and concomitantly inverting the bag so that the bag is free of the frame, the first surface is directed outwardly, the second surface is directed inwardly, and the waste material is inside the bag adjacent the second surface of the bag, whereby the waste material is packaged in the bag without contaminating the open end of the bag.

2. The process of claim 1 wherein the positioning step comprises scooping waste material from the ground by placing the closed end of the bag on the ground adjacent the waste material on the ground and pushing the device to force the central portion of the bag under the waste material.

3. The process of claim 1 wherein the positioning step comprises positioning the waste material on the central portion of the second surface of the bag to draw at least part of the periphery of the bag snug against the frame.

4. A process for packaging waste material in a bag in a rapid and reliable manner, with a minimum of handling, and without the need to contaminate the open end of the bag with waste material during the packaging process, said process comprising:
   (a) providing a packaging device comprising:
      (i) a bag having an open end, a closed end, a first surface, a second surface, a central portion spaced from the open end of the bag, and a periphery;
      (ii) a frame defining an open area and located at least partially within the bag with the first surface of the bag directed inwardly towards the frame, the second surface of the bag directed outwardly away from the frame, and the central portion of the bag in registration with the open area of the frame, the frame comprising at least two frame members that are rotatably connected to each other; and
      (iii) means to invert the bag as the bag is removed from the frame after waste material has been positioned on the central portion of the second surface of the bag;
   (b) positioning the waste material on the central portion of the second surface of the bag; and
   (c) removing the bag from the frame and concomitantly inverting the bag so that the bag is free of the frame, the first surface is directed outwardly, the second surface is directed inwardly, and the waste material is inside the bag adjacent the second surface of the bag, whereby the waste material is packaged in the bag without contaminating the open end of the bag.

5. The process of claim 4 wherein the positioning step comprises scooping waste material from the ground by placing the closed end of the bag on the ground adjacent the waste material on the ground and pushing the device to force the central portion of the bag under the waste material.

6. The process of claim 4 wherein the positioning step comprises positioning the waste material on the central portion of the second surface of the bag to draw at least part of the periphery of the bag snug against the frame.

7. The process of claim 4 further comprising rotating the frame members with respect to one another to aid in removing and inverting the bag.

8. The process of claim 4 further comprising rotating the frame members with respect to one another to collapse the frame.

9. A device for packaging waste material in a bag in a rapid and reliable manner, with a minimum of handling, and without the need to contaminate the open end of the bag with waste material during the packaging procedure, said device comprising:
   (a) a bag having an open end, a closed end, a first surface, a second surface, a central portion spaced from the open end of the bag, and a periphery;
   (b) a frame defining an open area and located at least partially within the bag with the first surface of the bag directed inwardly towards the frame, the second surface of the bag directed outwardly away from the frame, and the central portion of the bag in registration with the open area of the frame; and
   (c) means to invert the bag as the bag is removed from the frame after waste material has been positioned on the central portion of the second surface of the bag so that when the bag is free of the frame the first surface is directed outwardly, the second surface is directed inwardly, and the waste material is inside the bag adjacent the second surface of the bag.

10. The device of claim 9 wherein the frame comprises at least two frame members that are rotatably connected to each other.

11. The device of claim 9 further comprising a handle attached to the frame and defining a handle cavity for storage.

12. The device of claim 9 wherein the frame is substantially planar.

13. The device of claim 9 wherein the means for inverting the bag comprises two shoulders disposed from one another on opposite sides of the open area of the frame.

14. The device of claim 13 wherein the two shoulders and the open area of the frame lie in substantially the same plane.

* * * * *